(12) United States Patent
Yang et al.

(10) Patent No.: US 12,242,031 B2
(45) Date of Patent: Mar. 4, 2025

(54) LENS ASSEMBLY

(71) Applicant: Samsung Electro-Mechanics Co., Ltd., Suwon-si (KR)

(72) Inventors: Dong Shin Yang, Suwon-si (KR); Ju Sung Park, Suwon-si (KR); Ho Sik Yoo, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 352 days.

(21) Appl. No.: 17/014,068

(22) Filed: Sep. 8, 2020

(65) Prior Publication Data
US 2021/0199925 A1  Jul. 1, 2021

(30) Foreign Application Priority Data

Dec. 31, 2019  (KR) .................. 10-2019-0179878

(51) Int. Cl.
*G02B 13/00*  (2006.01)
*G02B 7/02*  (2021.01)

(52) U.S. Cl.
CPC ......... *G02B 13/0045* (2013.01); *G02B 7/021* (2013.01)

(58) Field of Classification Search
CPC .. G02B 27/0018; G02B 7/021; G02B 3/0087; G02B 27/00; G02B 7/02; G02B 13/0045; G02B 13/00; G02B 7/022; G02B 7/026; G03B 17/12; G03B 30/00; H04N 5/2257; H04N 5/2254; H04N 23/55
USPC ....................................... 359/827, 754, 819
See application file for complete search history.

(56) References Cited

U.S. PATENT DOCUMENTS

| | | | |
|---|---|---|---|
| 5,461,444 A | 10/1995 | Okura et al. | |
| 10,996,420 B2 | 5/2021 | Yang et al. | |
| 10,996,421 B2 | 5/2021 | Yang et al. | |
| 2013/0279032 A1* | 10/2013 | Suigetsu | G02B 7/026 359/827 |
| 2013/0287383 A1 | 10/2013 | Haruguchi et al. | |
| 2016/0147033 A1 | 5/2016 | Kudoh | |
| 2019/0170965 A1* | 6/2019 | Shabtay | G02B 13/009 |
| 2019/0346650 A1 | 11/2019 | Yang et al. | |

(Continued)

FOREIGN PATENT DOCUMENTS

| | | |
|---|---|---|
| CN | 109981942 A | 7/2019 |
| CN | 110471154 A | 11/2019 |

(Continued)

OTHER PUBLICATIONS

Chinese Office Action issued on Aug. 1, 2022, in counterpart Chinese Patent Application No. 202011299793.3 (11 Pages in English, 8 Pages in Chinese).

(Continued)

*Primary Examiner* — Thomas K Pham
*Assistant Examiner* — Kuei-Jen L Edenfield
(74) *Attorney, Agent, or Firm* — NSIP Law

(57) ABSTRACT

Disclosed are lens assembly including a lens having a length in a first direction, perpendicular to an optical axis, shorter than a length in a second direction, perpendicular to both the optical axis and the first direction, on a plane perpendicular to the optical axis, and a lens barrel accommodating the lens, and having an opening in a side of the lens barrel, wherein a side of the lens in the first direction is exposed through the opening.

18 Claims, 7 Drawing Sheets

(56) References Cited

U.S. PATENT DOCUMENTS

2020/0409020 A1* 12/2020 Yedid ..................... G02B 7/021
2021/0055508 A1* 2/2021 Chen .................. G02B 27/0018

FOREIGN PATENT DOCUMENTS

| | | | |
|---|---|---|---|
| JP | 7-5353 | A | 1/1995 |
| JP | 2013-228610 | A | 11/2013 |
| KR | 10-2008-0021883 | A | 3/2008 |
| KR | 10-2018-0107187 | A | 10/2018 |
| KR | 10-1968113 | B1 | 4/2019 |
| KR | 10-2019-0107826 | A | 9/2019 |
| KR | 10-2019-0129463 | A | 11/2019 |
| WO | WO 2018/154421 | A1 | 8/2018 |

OTHER PUBLICATIONS

Korean Office Action issued on Nov. 30, 2021 in counterpart Korean Patent Application No. 10-2019-0179878 (10 pages in English, 7 pages in Mandarin).

Korean Office Action issued on May 31, 2021 in counterpart Korean Patent Application No. 10-2019-0179878 (8 pages in English and 6 pages in Korean).

Korean Office Action issued on Aug. 17, 2023, in counterpart Korean Patent Application No. 10-2022-0124115 (9 pages in English, 7 pages in Korean).

* cited by examiner

LENS ASSEMBLY

CROSS-REFERENCE TO RELATED APPLICATION(S)

This application claims the benefit under 35 U.S.C. § 119(a) of Korean Patent Application No. 10-2019-0179878 filed on Dec. 31, 2019 in the Korean Intellectual Property Office, the entire disclosure of which is incorporated herein by reference for all purposes.

BACKGROUND

1. Field

The following description relates to a lens assembly.

2. Description of Related Art

Camera modules are used in portable electronic devices such as smartphones, and with the demand for miniaturization of portable electronic devices, miniaturization of camera modules mounted in portable electronic devices is also being demanded. However, if the size of the camera module is simply reduced, the performance of the camera module is degraded. Therefore, research is needed to reduce the size of the camera module while maintaining or improving the performance of the camera module.

Generally, the lens of the camera module is circular, and the image sensor of the camera module is rectangular, so all light is not refracted by the lens is focused on the image sensor.

Therefore, a method of reducing the size of the lens by removing superfluous portions from the lens to reduce the size of the camera module may be considered.

However, when a portion of the lens is removed, the length of the lens in one direction and the length of the lens in the other direction may be different, and there is a problem that the quality of the image may be deteriorated.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, there is provided a lens assembly including a lens having a length in a first direction, perpendicular to an optical axis, shorter than a length in a second direction, perpendicular to both the optical axis and the first direction, on a plane perpendicular to the optical axis, and a lens barrel accommodating the lens, and having an opening in a side of the lens barrel, wherein a side of the lens in the first direction is exposed through the opening.

The one of the lens and the lens barrel may be provided with a stopper portion preventing rotation of the lens relative to the lens barrel.

The stopper portion may include a protrusion provided on one of the lens and the lens barrel, and a groove provided in the other of the lens and the lens barrel where the protrusion is not disposed.

The protrusion and the groove may include surfaces facing each other in a direction perpendicular to the optical axis.

The lens assembly may include a plurality of lenses accommodated in the lens barrel to be disposed closer to the image sensor than the lens, wherein the lens may have a diameter greater than a diameter of each of the plurality of lenses.

The lens and the plurality of lenses may be provided with a spacer therebetween, wherein the spacer may be exposed through the opening.

The lens assembly may include at least one spacer disposed between each two of the lens and the plurality of lenses.

A lens assembly including a lens including an optical unit, and a flange portion extending from the optical unit, and a lens barrel accommodating the lens, wherein the optical unit has a length in a first direction perpendicular to the optical axis, shorter than a length in a second direction perpendicular to both the optical axis and the first direction, the lens barrel has an opening exposing a side of the optical unit in the first direction, and at least one of the flange portion and the lens barrel is provided with a stopper portion preventing rotation of the lens relative to the lens barrel.

A portion of a side of the flange portion and a side of the optical unit may be exposed through the opening.

The flange portion may extend in the second direction along a circumference of a portion of the optical unit, and at least a portion of the flange portion may be in contact with an internal surface of the lens barrel.

The stopper portion may include a protrusion disposed in a groove, and the protrusion may be provided on one of the flange portion and the lens barrel, and the groove provided in the other of the flange portion and the lens barrel.

The protrusion and the groove may include surfaces facing each other in a direction perpendicular to the optical axis.

When viewed from an optical axis direction, the optical unit may have a first edge having an arc shape, a second edge opposing the first edge and having an arc shape, and a third edge and a fourth edge connecting the first edge and the second edge.

The first edge and the second edge may be disposed to face each other based on the optical axis, and the third edge and the fourth edge may be disposed to face each other based on the optical axis.

The flange portion may extend from the first edge and the second edge.

The third edge and the fourth edge may be exposed through the opening.

A plurality of lenses accommodated in the lens barrel to be disposed closer to an image sensor than the lens, and a spacer disposed between the lens and the plurality of lenses, wherein the spacer may be exposed through the opening, and wherein a length of the spacer in the first direction may be greater than a length of a lens adjacent to the spacer in the first direction, among the plurality of lenses.

Other features and aspects will be apparent from the following detailed description, the drawings, and the claims.

Figure 1:
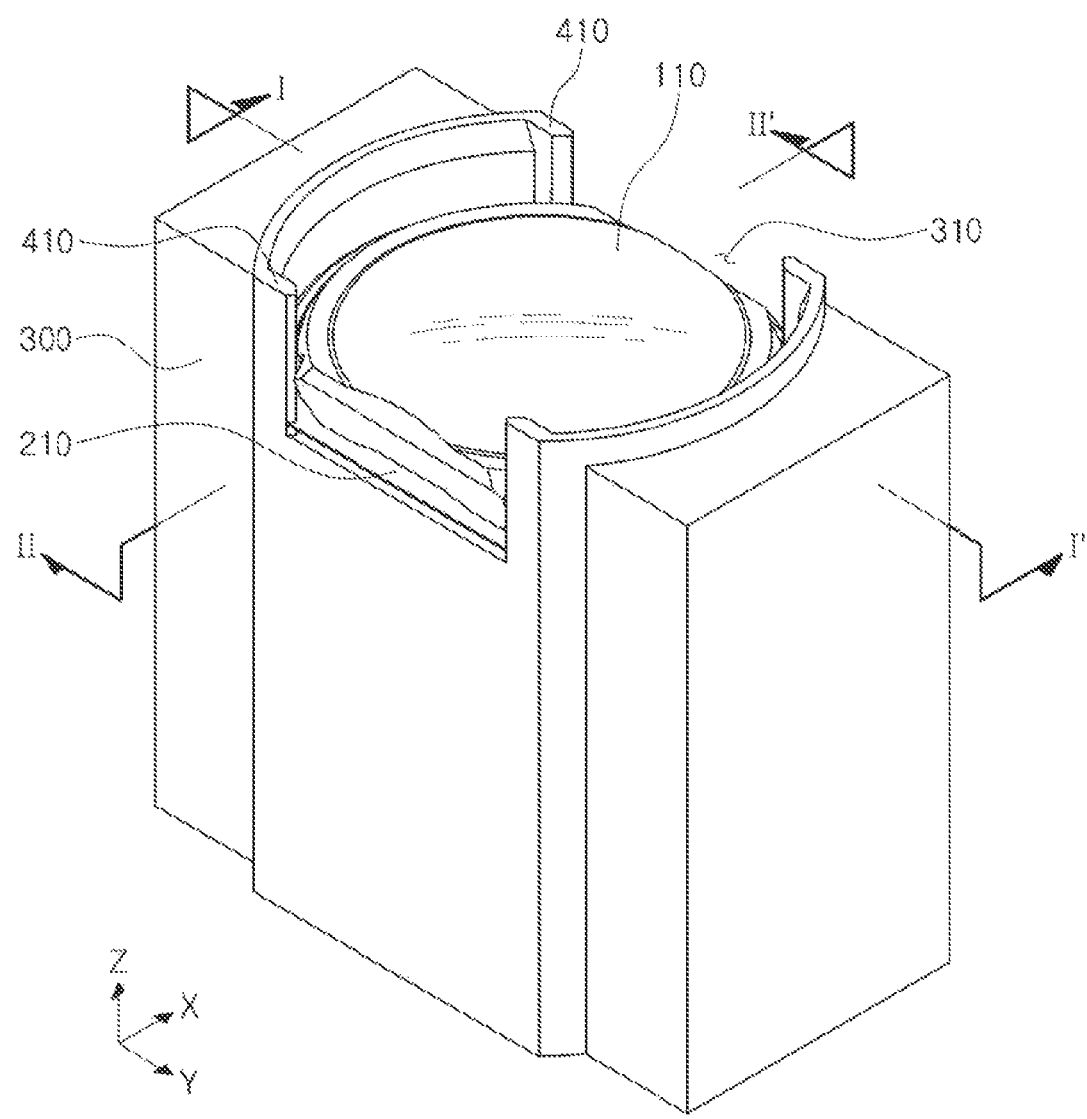
FIG. 1 illustrates an example of a lens assembly.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. As used herein, the term "and/or" includes any one and any combination of any two or more of the associated listed items.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

A lens assembly according to an example may be provided in a camera module mounted on a portable electronic device.

In this specification, the portable electronic device may indicate a portable electronic device such as, for example, a mobile communication terminal, a smartphone, a wearable device, a TV, a smart appliance, a smart home device, a home appliance, a biometric door lock, a security device, various Internet of Things (IoT) devices, and a tablet PC.

Figure 2:
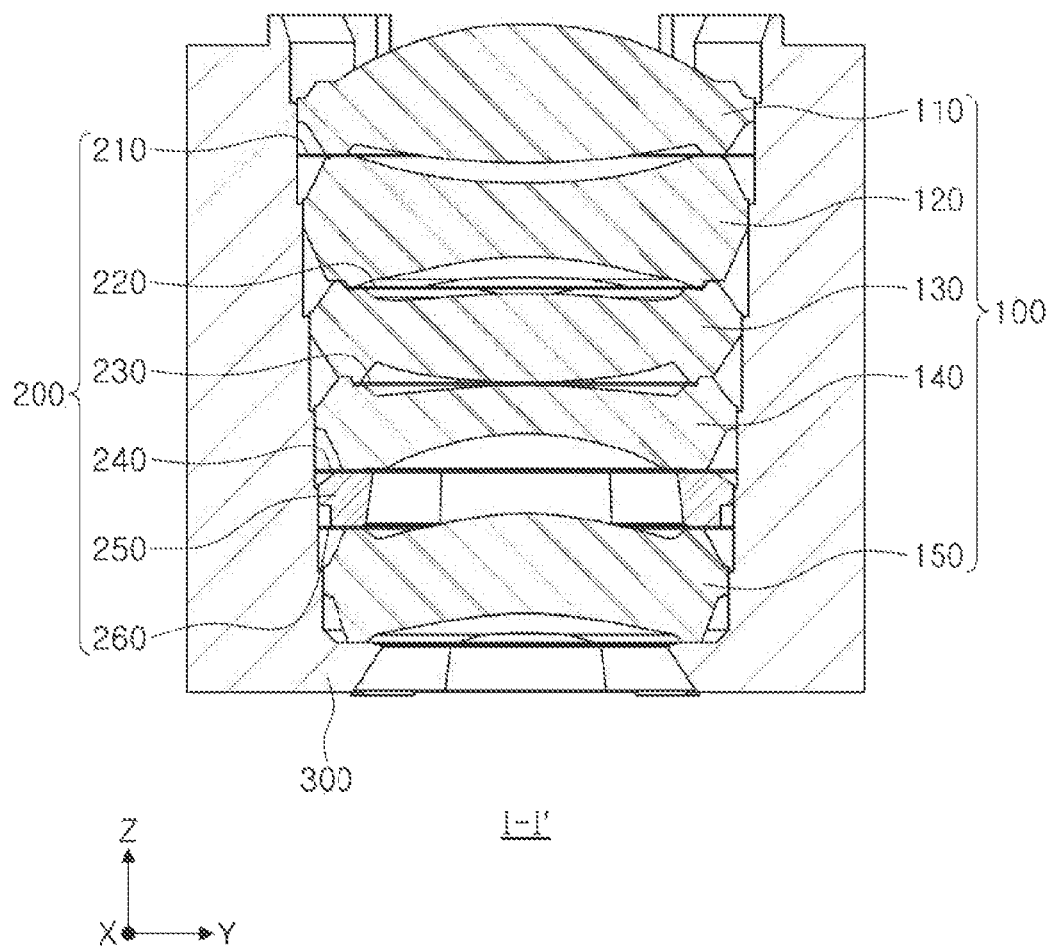
FIG. 2 illustrates an example of a cross-sectional view taken along line I-I' in FIG. 1.
Figure 3:
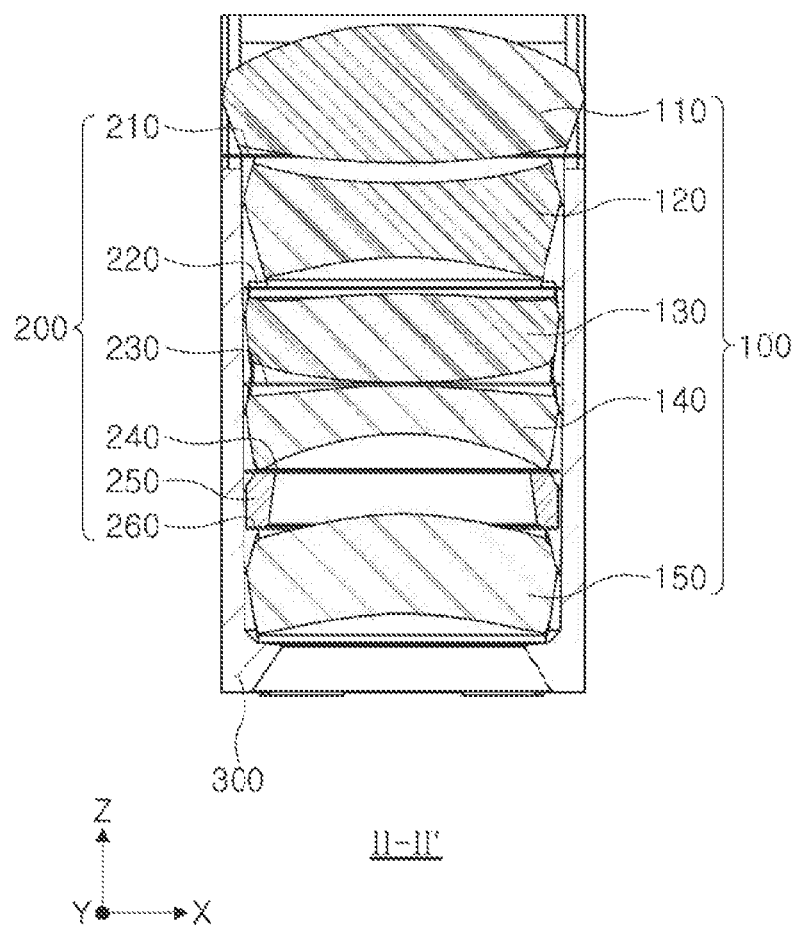
FIG. 3 illustrates an example of a cross-sectional view taken along line II-II' in FIG. 1.

FIG. 1 is a diagram illustrating an example of a lens assembly according to an example, FIG. 2 is a cross-sectional view taken along line I-I' of FIG. 1, and FIG. 3 is a cross-sectional view taken along line II-II' of FIG. 1.

Figure 4:
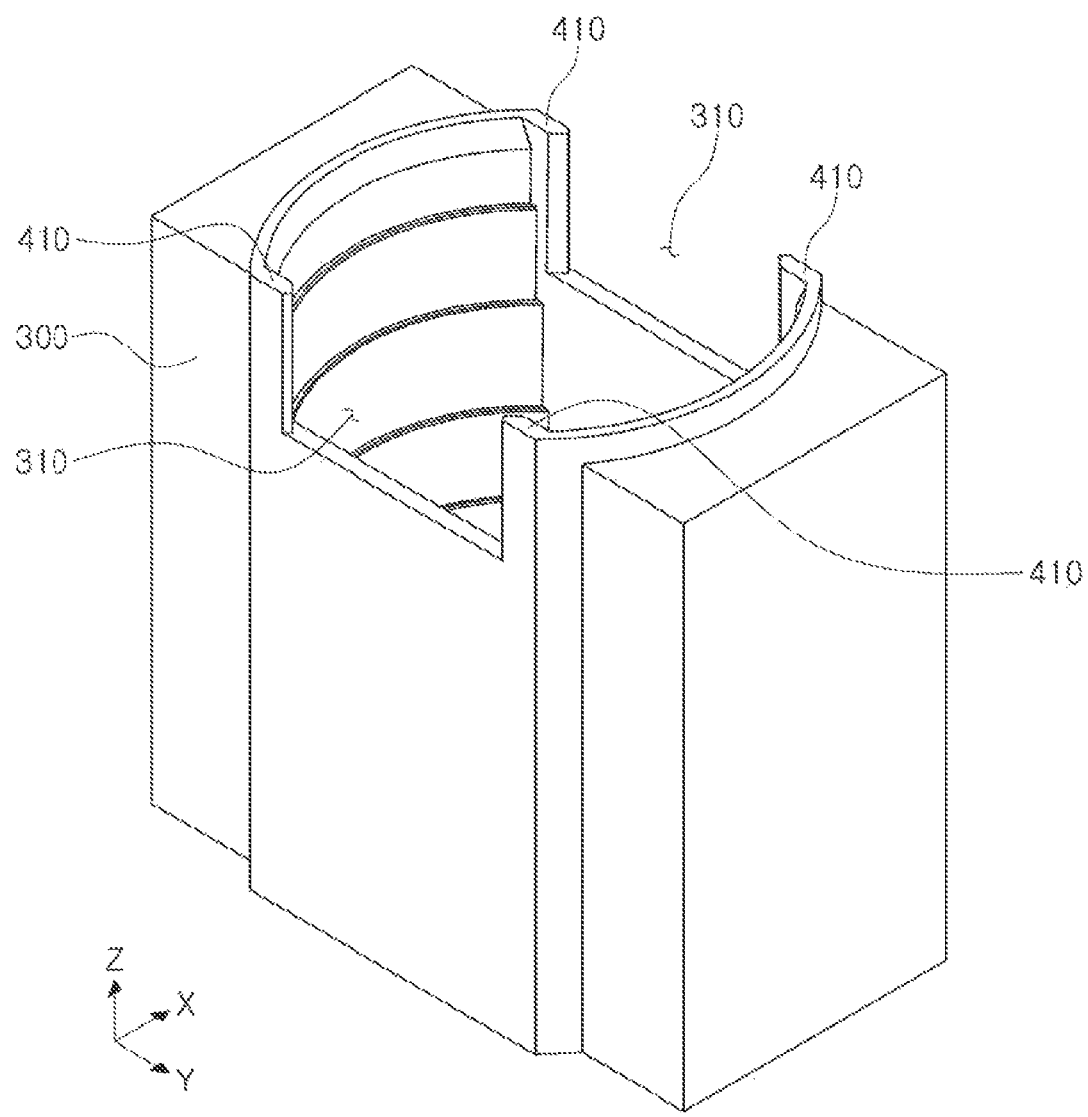
FIG. 4 illustrates an example of a lens barrel.
Figure 5:
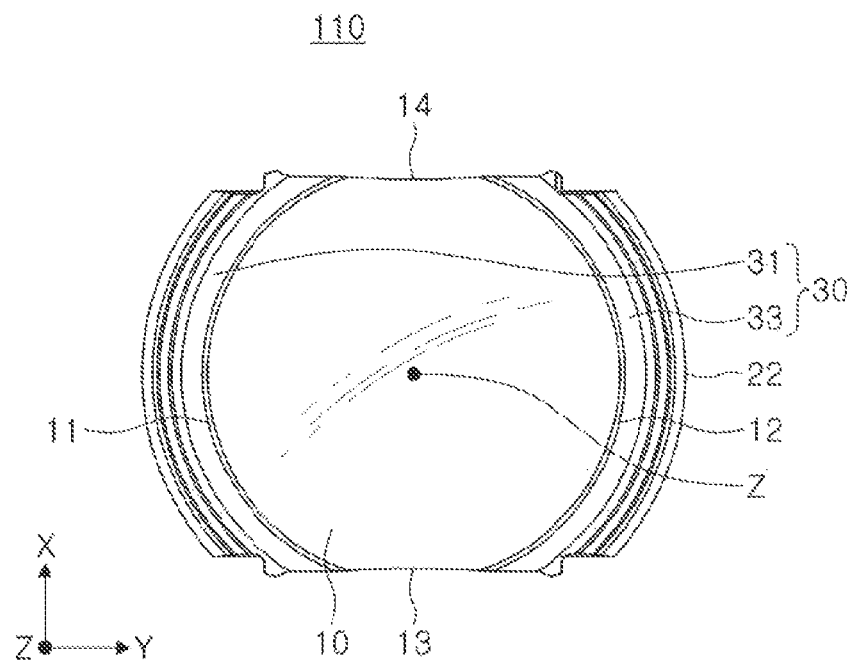
FIG. 5 illustrates an example of a first lens.

FIG. 4 is a diagram illustrating an example of a lens barrel, and FIG. 5 is a diagram illustrating an example of a first lens.

Referring to FIGS. 1 to 4, a lens assembly according to an example includes a lens unit 100 and a lens barrel 300.

The lens unit 100 includes a plurality of lenses. For example, the lens unit 100 includes a first lens 110, a second lens 120, a third lens 130, a fourth lens 140, and a fifth lens 150 disposed in order along an optical axis (a Z axis).

The first lens 110 indicates a lens closest to an object side from among a plurality of lenses. The second to fifth lenses 120 to 150 are disposed closer to an image sensor than the first lens 110.

In this specification, the lens unit 100 is described as including five lenses, but the number of the lenses is not limited thereto. The number of lenses may be determined depending on the performance of the lens assembly.

Each of the plurality of lenses includes an optical unit and a flange portion. The optical unit may be the configuration to exhibit optical performance of the lens. For example, light reflected from the subject may be refracted while passing through the optical unit.

The flange portion may fix the lens to other members, for example, to the lens barrel 300 or another lens.

The flange portion extends from the optical unit, and may be integrally formed with the optical unit.

Referring to FIG. 5, the first lens 110 is formed to have a non-circular shape. When viewed in the optical axis (the Z axis) direction, the first lens 110 is non-circular. For example, on a plane perpendicular to the optical axis (the Z axis), the first lens 110 has a length in a first direction (an X direction) perpendicular to the optical axis (the Z axis), less than a length in a second direction (a Y direction) perpendicular to both the optical axis (the Z axis) and the first direction (the X direction).

The first lens 110 includes an optical unit 10 and a flange portion 30.

The optical unit 10 of the first lens 110 is formed to have a non-circular shape. For example, on the plane perpendicular to the optical axis (the Z axis), the optical unit 10 has a length in the first direction (the X direction) perpendicular to the optical axis (the Z axis), less than a length in the second direction (the Y direction) perpendicular to both the optical axis (the Z axis) and the first direction (the X direction).

As shown in FIG. 5, the optical unit 10 includes a first edge 11, a second edge 12, a third edge 13 and a fourth edge 14.

When viewed in the optical axis (the Z axis) direction, the first edge 11 and the second edge 12 each have an arc shape.

In an example, the second edge 12 is provided on the opposite side of the first edge 11. The first edge 11 and the second edge 12 are positioned to face each other based on the optical axis (the Z axis).

The fourth edge 14 is provided on the opposite side of the third edge 13. The third edge 13 and the fourth edge 14 are positioned to face each other based on the optical axis (the Z axis).

The third edge 13 and the fourth edge 14 respectively connect the first edge 11 and the second edge 12.

When viewed in the optical axis (the Z axis) direction, the first edge 11 and the second edge 12 have an arc shape, and the third edge 13 and the fourth edge 14 have a substantially linear shape.

The flange portion 30 extends in the second direction (the Y direction) along the circumference of a portion of the optical unit 10. At least a portion of the flange portion 30 contacts the inner surface of the lens barrel 300.

The flange portion 30 includes a first flange portion 31 and a second flange portion 32. The first flange portion 31 extends from the first edge 11 of the optical unit 10, and the second flange portion 32 extends from the second edge 12 of the optical unit 10.

The first edge 11 of the optical unit 10 may indicate a portion adjacent to the first flange portion 31, and the second edge 12 of the optical unit 10 may indicate a portion adjacent to the second flange portion 32.

The third edge 13 of the optical unit 10 may indicate one side of the optical unit 10 on which the flange portion 30 is not formed, and the fourth edge 14 of the optical unit 10 may indicate the other side of the optical unit 10 on which the flange portion 30 is not formed.

In an example, the first lens 110 is formed of a plastic material, and is injection molded through a mold. In this refracted case, the first lens 110 according to this example is not manufactured by cutting a portion of the lens after injection molding, but is manufactured to have the above shape in the injection molding stage.

In general, since lenses are substantially circular, and the image sensor of the camera module is rectangular, thus, all light refracted by the circular lens is not focused on the image sensor.

Accordingly, the size of the first lens 110 may be reduced by removing an unnecessary portion from the optical unit 10 of the first lens 110, thereby reducing the size of the lens assembly.

However, if a portion of the first lens 110 is removed after injection molding, there is a concern that the first lens 110 may be deformed by the force applied to the first lens 110 in the process thereof. When the first lens 110 is deformed, the optical performance of the first lens 110 is inevitably changed.

However, in the first lens 110 according to the example of the present disclosure, since the first lens 110 is formed to have a non-circular shape at the time of injection, the size of the first lens 110 may be reduced while securing performance of the first lens 110.

For convenience, the first lens 110 has been described, but the remaining lenses may also be formed to have a non-circular shape as in the first lens 110.

The lens unit 100 is accommodated in the lens barrel 300. For example, the first lens 110 to the fifth lens 150 are disposed inside the lens barrel 300 along the optical axis (the Z axis).

Referring to FIG. 2, the first lens 110 disposed closest to the object side may be fitted to the lens barrel 300. For example, in the first lens 110, the flange portion 30 is in contact with the inner surface of the lens barrel 300 such that the position thereof relative to the lens barrel 300 may be fixed.

The second lens 120 to the fourth lens 140 may be coupled to each other between neighboring lenses. For example, the second lens 120 to the fourth lens 140 may be aligned with the optical axis (the Z axis) as uneven portions provided in the respective flange portions contact each other, and the relative positions thereof with respect to the lens barrel 300 may be fixed.

The fifth lens 150 disposed closest to the image sensor may be fitted to the lens barrel 300. For example, in the case of the fifth lens 150, as a flange portion thereof contacts the inner surface of the lens barrel 300, a position of the fifth lens relative to the lens barrel 300 may be fixed.

A spacer 200 may be disposed between lenses adjacent to each other. At least a portion of the flange portion of each lens may be in contact with the spacer 200. The spacer 200 may maintain a gap between the lenses and block unnecessary light.

The spacer 200 may be provided with a light absorbing layer to block unnecessary light. In an example, the light absorbing layer may be a black film or black iron oxide.

The spacer 200 may include a first spacer 210, a second spacer 220, a third spacer 230, a fourth spacer 240, a fifth spacer 250 and a sixth spacer 260, disposed toward the image sensor from the object side.

The first spacer 210 is disposed between the first lens 110 and the second lens 120, the second spacer 220 is disposed between the second lens 120 and the third lens 130, the third spacer 230 is disposed between the third lens 130 and the fourth lens 140, and the fourth to sixth spacers 240 to 260 may be disposed between the fourth lens 140 and the fifth lens 150.

In an example, the fifth spacer 250 is disposed between the fourth spacer 240 and the sixth spacer 260, and the fifth spacer 250 may have a thickest thickness among the spacers 200. For example, the thickness of the fifth spacer 250 in the optical axis (the Z axis) direction is formed to be greater than that of the other spacers in the optical axis (the Z axis) direction.

In an example, the first lens 110 to the fifth lens 150 may be respectively formed to have a non-circular shape. Therefore, each lens may have a length in a first direction (the X direction), different from a length in a second direction (the Y direction).

The larger the difference between the length of each lens in the first direction (the X direction) and the length in the second direction (the Y direction) is, the lower the quality of the captured image may be. Thus, it is necessary to reduce the difference in lengths of each lens in the first direction (the X direction) and in the second direction (the Y direction).

Therefore, the lens assembly according to an example is configured, in such a manner that an opening 310 is formed in the lens barrel 300 and sides of some lenses are exposed through the opening 310, thereby significantly reducing the difference between the length in the first direction (the X direction) and the length in the second direction (the Y direction) of the lens.

For example, as shown in FIG. 3, a side of a portion of the plurality of lenses of the lens unit 100 may be exposed externally through the opening 310 of the lens barrel 300.

In an example, the side of the lens exposed through the opening 310 of the lens barrel 300 may be a side having a relatively shorter length (e.g., a side in the first direction (the X direction)).

The openings 310 of the lens barrel 300 are provided in one side of the lens barrel 300 and in the other side thereof, as the opposite side of the one side, respectively, to expose both sides of some lenses in the first direction (the X direction) among the plurality of lenses.

The larger the diameter of the lens is, the greater the difference between the length in the first direction (the X direction) and the length in the second direction (the Y direction) is, and thus, the lens having the exposed side may be the lens having a largest diameter among the plurality of lenses.

In this case, 'diameter' indicates the diameter (e.g., the length in the second direction (the Y direction)) of the longer side of the lens on the plane perpendicular to the optical axis (the Z axis).

In this example, the first lens 110 has a diameter greater than that of the remaining lenses.

Since the diameter of the first lens 110 is formed to be the largest, eventually, the side of the first lens 110 is exposed through the opening 310 of the lens barrel 300. The side of the first lens 110 is disposed in the opening 310 of the lens barrel 300.

The side of the first lens 110 may be a portion of the side surface of the flange portion 30 of the first lens 110 and the side surface of the optical unit 10 of the first lens 110. Since the third edge 13 and the fourth edge 14 of the optical unit 10 may indicate the side surface of the optical unit 10 on which the flange portion 30 is not formed, the third edge 13 and the fourth edge 14 of the optical unit 10 may be exposed through the openings 310 of the lens barrel 300.

Therefore, compared to the case in which the opening 310 is not formed in the lens barrel 300, the length of the first lens 110 in the first direction (the X direction) may be relatively greater, and accordingly, the length of the optical unit 10 in the first direction (the X direction) may be relatively greater.

In the lens assembly according to an example of the present disclosure, the deviation between the length of the first lens 110 in the first direction (the X direction) and the length of the first lens 110 in the second direction (the Y direction) may be reduced. Thus, the size of the lens and lens assembly may be reduced while preventing deterioration in an image quality.

FIGS. 6 to 10 illustrates examples of the stopper portion of the lens assembly.

Since the side surface of the first lens 110 is exposed through the opening 310 of the lens barrel 300, there is a concern that the first lens 110 may be rotated about the optical axis (the Z axis).

For example, in a case in which the opening 310 is not formed in the lens barrel 300, the inner surface of the lens barrel 300 may function to prevent the first lens 110 from rotating, but in this example, since the side surface of the first lens 110 is exposed through the opening 310 of the lens barrel 300, the first lens 110 may be rotated around the optical axis (the Z axis).

Therefore, the lens assembly may include a stopper portion 400 to prevent the first lens 110 from being rotated.

The stopper portion 400 may be provided on at least one of the first lens 110 and the lens barrel 300. For example, the stopper portion 400 may be provided in at least one of the flange portion 30 of the first lens 110 and the lens barrel 300.

The stopper portion 400 includes a protrusion 410 provided on one of the first lens 110 and the lens barrel 300, and a groove 430 which is provided on the other of the first lens 110 and the lens barrel 300 and in which the protrusion 410 is disposed. For example, the lens barrel 300 may be provided with the protrusion 410 protruding toward the flange portion 30, and the flange portion 30 may be provided with the groove 430 in which the protrusion 410 is disposed.

The flange portion 30 and the lens barrel 300 may be provided with the groove 430 and the protrusion 410 in portions corresponding to each other.

Figure 6:
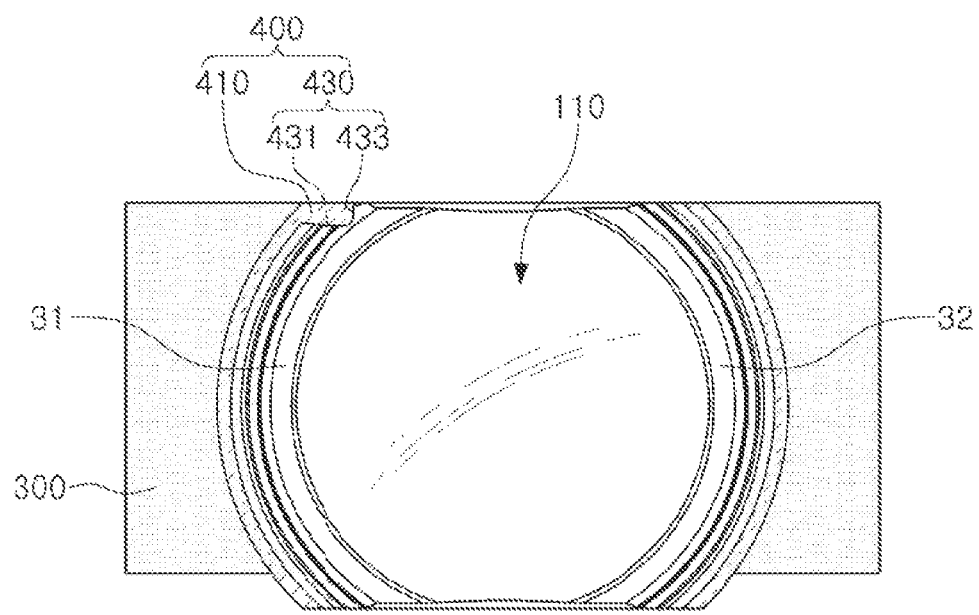
FIGS. 6 to 10 illustrate examples of a stopper portion of a lens assembly.

As illustrated in FIG. 6, the groove 430 may be formed in one end of the first flange portion 31 (a portion close to the opening 310 of the lens barrel 300.

Figure 7:
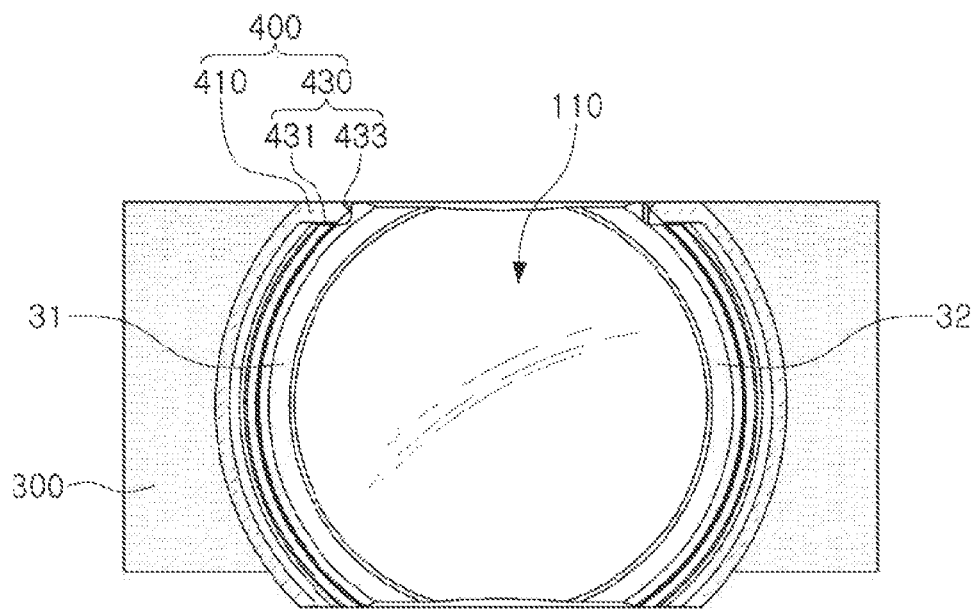

In another example, as illustrated in FIG. 7, grooves 430 may be formed in one end of the first flange portion 31 and one end of the second flange portion 32.

Figure 8:
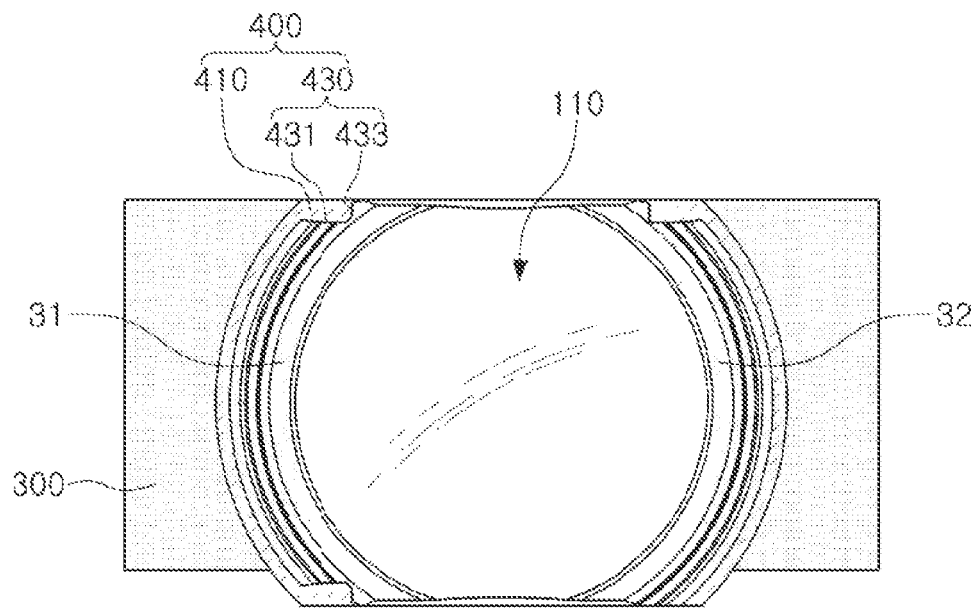

In another example, as illustrated in FIG. 8, grooves 430 may be formed in both ends of the first flange portion 31 and in one end of the second flange portion 32.

Figure 9:
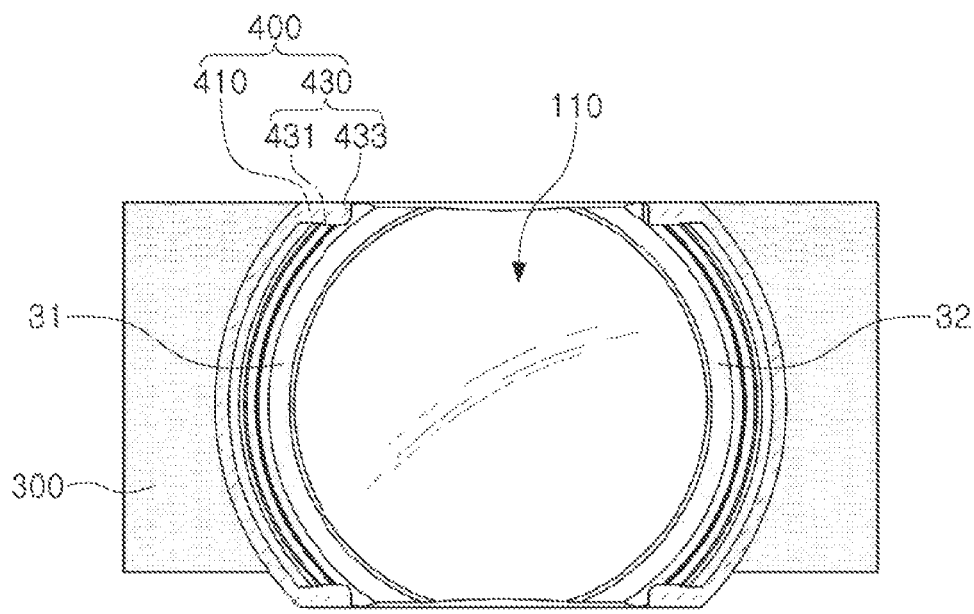

In another example, as illustrated in FIG. 9, grooves 430 may be formed in both ends of the first flange portion 31 and in both ends of the second flange portion 32.

In the respective cases illustrated in FIGS. 6 to 9, the lens barrel 300 has the protrusion 410 in a position corresponding to the groove 430.

The protrusion 410 and the groove 430 have surfaces facing each other in a direction perpendicular to the optical axis (the Z axis). Therefore, the protrusion 410 and the groove 430 are engaged or interfered with each other, thereby preventing the first lens 110 from being rotated around the optical axis (the Z axis).

Figure 10:
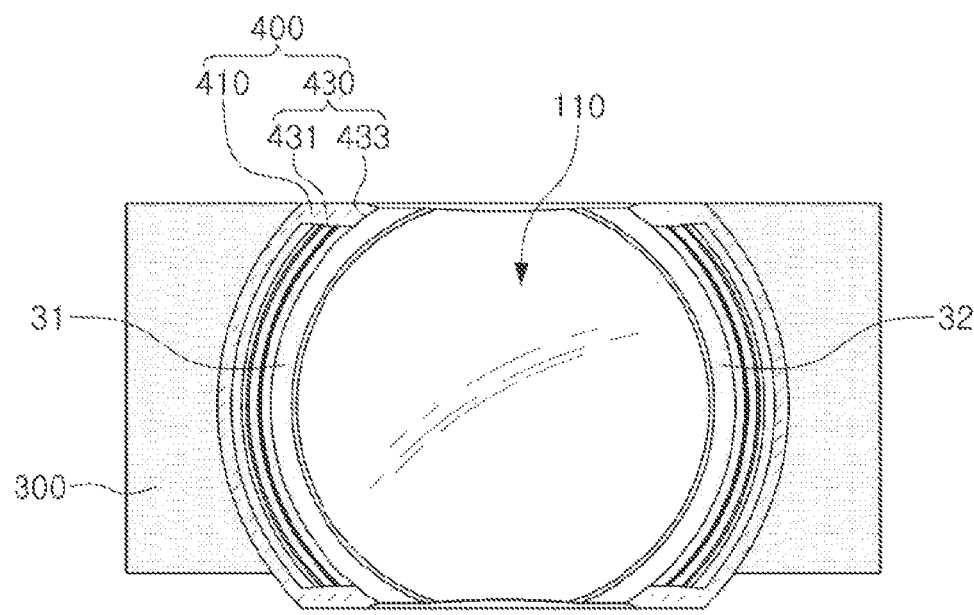

As illustrated in FIGS. 6 to 9, the groove 430 includes a first inner wall 431 and a second inner wall 433, and the angle between the first inner wall 431 and the second inner wall 433 may be acute. In another example, as illustrated in FIG. 10, the angle between the first inner wall 431 and the second inner wall 433 may be an obtuse angle.

In an example, although it has been described that the protrusion 410 is provided on the inner surface of the lens barrel 300 and the groove 430 is provided on the first lens 110, the protrusion 410 and the groove 430 may also be provided mutually conversely.

On the other hand, since the opening 310 is provided on the side surface of the lens barrel 300, unnecessary light may be incident through the opening 310.

However, in an example, unnecessary light may be blocked through the first spacer 210 disposed between the first lens 110 and the second lens 120.

As illustrated in FIGS. 1 and 3, the first spacer 210 may be exposed through the opening 310 of the lens barrel 300 and may be extended to be disposed in the opening 310.

For example, a portion of the side surface of the first spacer 210 may be extended to be disposed in the opening 310 of the lens barrel 300.

In an example, the first spacer 210 may be larger than the second lens 120. For example, the length of the first spacer 210 in the first direction (the X direction) is greater than the length of the second lens 120 in the first direction (the X direction).

Therefore, unnecessary light may be prevented from entering the lens barrel 300.

Referring to the above examples, the size of the lens assembly may be reduced while securing the performance of the lens assembly for the lens assembly described above.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly, comprising:
    a lens having a length in a first direction, perpendicular to an optical axis, shorter than a length in a second direction, perpendicular to both the optical axis and the first direction, on a plane perpendicular to the optical axis; and
    a lens barrel accommodating the lens, and having an opening in a side of the lens barrel,
    wherein a linear side of the lens facing the first direction is entirely exposed within the opening in the side of the lens barrel.

2. The lens assembly of claim 1, wherein one of the lens and the lens barrel is provided with a stopper portion adjacent to the linear side of the lens, and the stopper portion is configured to prevent rotation of the lens relative to the lens barrel in the plane perpendicular to the optical axis.

3. The lens assembly of claim 2, wherein the stopper portion comprises a protrusion provided on one of the lens and the lens barrel, and a groove provided in the other of the lens and the lens barrel where the protrusion is not disposed.

4. The lens assembly of claim 3, wherein the protrusion and the groove comprise surfaces facing each other in a direction perpendicular to the optical axis.

5. The lens assembly of claim 1, further comprising a plurality of lenses accommodated in the lens barrel to be disposed closer to an image sensor than the lens,
    wherein the lens has a diameter greater than a diameter of each of the plurality of lenses.

6. The lens assembly of claim 5, wherein the lens and the plurality of lenses are provided with a spacer therebetween,
    wherein the spacer is exposed through the opening.

7. The lens assembly of claim 5, further comprising at least one spacer disposed between each two of the lens and the plurality of lenses.

8. A lens assembly, comprising:
    a lens including an optical unit, and a flange portion extending from the optical unit; and
    a lens barrel accommodating the lens,
    wherein the optical unit has a length in a first direction perpendicular to the optical axis, shorter than a length in a second direction perpendicular to both the optical axis and the first direction,
    wherein the lens barrel has an opening that exposes an entire linear side of the lens of the optical unit within the opening, and facing the first direction,
    wherein at least one of the flange portion and the lens barrel is provided with a stopper portion configured to prevent rotation of the lens relative to the lens barrel, and
    wherein the entire linear side of the lens facing the first direction is spaced apart from an inner surface of the lens barrel.

9. The lens assembly of claim 8, wherein a portion of a side of the flange portion and a side of the optical unit are exposed through the opening.

10. The lens assembly of claim 8, wherein the flange portion extends in the second direction along a circumference of a portion of the optical unit, and at least a portion of the flange portion is in contact with an internal surface of the lens barrel.

11. The lens assembly of claim 8, wherein the stopper portion comprises a protrusion disposed in a groove, and the protrusion is provided on one of the flange portion and the lens barrel, and the groove provided in the other of the flange portion and the lens barrel.

12. The lens assembly of claim 11, wherein the protrusion and the groove comprise surfaces facing each other in a direction perpendicular to the optical axis.

13. The lens assembly of claim 8, wherein when viewed from an optical axis direction, the optical unit has a first edge having an arc shape, a second edge opposing the first edge and having an arc shape, and a third edge and a fourth edge connecting the first edge and the second edge.

14. The lens assembly of claim 13, wherein the first edge and the second edge are disposed to face each other based on the optical axis, and the third edge and the fourth edge are disposed to face each other based on the optical axis.

15. The lens assembly of claim 13, wherein the flange portion extends from the first edge and the second edge.

16. The lens assembly of claim 13, wherein the third edge and the fourth edge are exposed through the opening.

17. The lens assembly of claim 8, further comprising:
    a plurality of lenses accommodated in the lens barrel to be disposed closer to an image sensor than the lens; and
    a spacer disposed between the lens and the plurality of lenses,
    wherein the spacer is exposed through the opening, and
    wherein a length of the spacer in the first direction is greater than a length of a lens adjacent to the spacer in the first direction, among the plurality of lenses.

18. A lens assembly, comprising:
- a lens having a length in a first direction, perpendicular to an optical axis, shorter than a length in a second direction, perpendicular to both the optical axis and the first direction, on a plane perpendicular to the optical axis; and
- a lens barrel accommodating the lens, and having an opening in a side of the lens barrel,
- wherein a linear side of the lens facing the first direction is disposed inside the opening in the side of the lens barrel within sidewalls of the lens barrel.

* * * * *